United States Patent
Moilanen et al.

[11] Patent Number: 6,056,281
[45] Date of Patent: May 2, 2000

[54] ADJUSTABLE STOPPERS AND MOUNTING ASSEMBLIES FOR PARTS GRIPPERS

[75] Inventors: Steven M. Moilanen, Fort Wayne; Bruce D. McIntosh, Monroeville; Kenneth Steele, Fort Wayne, all of Ind.

[73] Assignee: PHD, Inc., Fort Wayne, Ind.

[21] Appl. No.: 09/199,957

[22] Filed: Nov. 25, 1998

Related U.S. Application Data

[63] Continuation-in-part of application No. 08/943,898, Oct. 3, 1997, Pat. No. 5,941,513, and a continuation-in-part of application No. 08/981,863, Aug. 4, 1998.

[51] Int. Cl.⁷ ........................................... B23Q 3/08
[52] U.S. Cl. .................. 269/32; 269/34; 269/237
[58] Field of Search ................. 269/32, 34, 237, 269/238, 239, 233; 81/57.42, 57.44

[56] References Cited

U.S. PATENT DOCUMENTS

| | | |
|---|---|---|
| Re. 34,120 | 11/1992 | Plahn . |
| 229,670 | 7/1880 | Carrick . |
| D. 230,826 | 3/1974 | Menshen . |
| D. 296,546 | 7/1988 | Sachs . |
| 320,436 | 6/1885 | Hock . |
| 377,114 | 1/1888 | Pague . |
| 490,150 | 1/1893 | Low . |
| 659,532 | 10/1900 | Jordan . |
| 669,358 | 5/1901 | Wilson . |
| 688,230 | 12/1901 | Isgrig et al. . |
| 746,360 | 12/1903 | McAdams . |
| 1,468,110 | 9/1923 | Howe . |
| 1,472,566 | 10/1923 | Oishei . |
| 1,494,033 | 5/1924 | Stevens . |
| 1,543,037 | 6/1925 | Teeter . |
| 1,590,227 | 6/1926 | Britton . |
| 1,929,361 | 10/1933 | Liljebladh . |
| 1,929,807 | 10/1933 | Casper . |
| 1,940,258 | 12/1933 | Lautz . |
| 1,955,226 | 4/1934 | Chavannes . |
| 1,986,149 | 1/1935 | Harris . |
| 2,081,749 | 5/1937 | Kritzler et al. . |
| 2,141,945 | 12/1938 | Tweedale . |
| 2,168,988 | 8/1939 | Hultquist . |
| 2,188,514 | 1/1940 | Moore . |
| 2,198,623 | 4/1940 | Kastler . |
| 2,212,156 | 8/1940 | Erdley . |
| 2,295,051 | 9/1942 | Roth . |
| 2,381,657 | 8/1945 | Eksergian et al. . |
| 2,452,406 | 10/1948 | Volkery et al. . |
| 2,469,542 | 5/1949 | Becker . |
| 2,499,136 | 2/1950 | Edlund et al. . |
| 2,565,793 | 8/1951 | Weismantel . |
| 2,651,026 | 9/1953 | Roth . |
| 2,701,492 | 2/1955 | Johnson ........................................ 81/78 |
| 2,769,895 | 11/1956 | Boord . |
| 2,776,168 | 1/1957 | Schweda . |
| 2,791,623 | 5/1957 | Lock et al. . |
| 2,825,601 | 3/1958 | Doty . |
| 2,858,522 | 10/1958 | Wengen et al. . |
| 3,146,982 | 9/1964 | Budnick . |
| 3,349,927 | 10/1967 | Blatt . |
| 3,350,132 | 10/1967 | Ashton . |

(List continued on next page.)

*Primary Examiner*—Timothy V. Eley
*Assistant Examiner*—Benjamin M. Halpern
*Attorney, Agent, or Firm*—Barnes & Thornburg

[57] ABSTRACT

Adjustable stoppers for limiting the angle at which pivotal gripper jaws are opened. The stoppers include a stop block and at least one stopper pad which is made from a shock absorbing material such as urethane. The stoppers are secured to a pivotal one of a pair of gripper jaw members of a parts gripper and positioned to abut the other of the pair of gripper jaw members. Stoppers which are provided with two or more stopper pads of different lengths are reversible and can be used to adjust the angle at which the jaw members open. A mounting assembly which includes a mounting plate, and clamping plate and a spherical collar therebetween can be used to mount a workpiece holder from the rear or at a side. Providing the mounting plate with a central circular bore allows a cylindrical support member to be inserted therein and thus axially aligned with the mounting plate. Inserting the cylindrical support member only into the spherical collar allows the support to be angularly aligned with respect to the mounting plate.

21 Claims, 4 Drawing Sheets

U.S. PATENT DOCUMENTS

| | | |
|---|---|---|
| 3,482,830 | 12/1969 | Sendoykas . |
| 3,568,959 | 3/1971 | Blatt . |
| 3,613,904 | 10/1971 | Blatt . |
| 3,635,514 | 1/1972 | Blatt . |
| 3,664,654 | 5/1972 | Manville . |
| 3,677,584 | 7/1972 | Short . |
| 3,712,415 | 1/1973 | Blat et al. . |
| 3,920,295 | 11/1975 | Speckin . |
| 3,975,068 | 8/1976 | Speckin . |
| 4,275,872 | 6/1981 | Mullis . |
| 4,307,864 | 12/1981 | Benoit . |
| 4,355,922 | 10/1982 | Sato . |
| 4,382,572 | 5/1983 | Thompson . |
| 4,453,755 | 6/1984 | Blatt . |
| 4,473,249 | 9/1984 | Valentine et al. . |
| 4,480,497 | 11/1984 | Locher . |
| 4,495,834 | 1/1985 | Bauer et al. . |
| 4,515,336 | 5/1985 | Fischer . |
| 4,596,415 | 6/1986 | Blatt . |
| 4,708,297 | 11/1987 | Boers . |
| 4,805,938 | 2/1989 | Redmond et al. . |
| 4,941,481 | 7/1990 | Wagenknecht . |
| 4,957,318 | 9/1990 | Blatt . |
| 5,016,850 | 5/1991 | Plahn . |
| 5,261,715 | 11/1993 | Blatt et al. . |
| 5,271,651 | 12/1993 | Blatt et al. . |
| 5,299,847 | 4/1994 | Blatt et al. . |
| 5,647,625 | 7/1997 | Sawdon . |

ADJUSTABLE STOPPERS AND MOUNTING ASSEMBLIES FOR PARTS GRIPPERS

RELATED APPLICATIONS

This application is a continuation-in-part of U.S. patent application Ser. No. 08/943,898 now U.S. Pat. No. 5,941,513, filed Oct. 3, 1997 and U.S. patent application Ser. No. 08/981,863, filed Aug. 4, 1998, the complete disclosures of which are hereby expressly incorporated by reference into the present application.

TECHNICAL FIELD

The present invention relates to fluid pressure actuated grippers of the type employed in automated workpiece handling devices which clampingly grip and transfer workpieces from one station to another. More particularly, the present invention relates to adjustable stoppers and mounting assemblies for fluid pressure actuated grippers.

BACKGROUND ART

Fluid pressure actuated grippers are widely employed and typically take the form of a pneumatic or hydraulic differential motor whose cylinder is fixedly mounted to a transfer device. At the forward or rod end of the cylinder housing, a gripper jaw mounting structure is fixedly mounted on the cylinder to pivotally support a pair of opposed gripper jaws which are coupled to the piston rod of the motor by a linkage so arranged that upon movement of the piston in one direction the jaws are pivoted to an open position and upon movement of the piston in the opposite direction the jaws are driven to a closed workpiece gripping position.

In typical operation, the gripper jaws will be closed upon a workpiece near the edge of the workpiece and the gripper will be advanced to position the gripped workpiece in operative relationship with a work station. The gripper will then be opened to release the workpiece and the transfer device will retract the gripper from the work station while the work operation is performed. At the conclusion of the work operation, the gripper will then advance back into the work station and the jaws will again close upon the workpiece and carry it away from the work station. Opening and closing the gripper jaws thus takes place when the gripper is in its closest proximity to tooling at the work station.

There are basically two types of linkage arrangements used in fluid pressure actuated grippers to connect the gripper jaws to the piston rods and effect movement of the gripper jaws. These are pivotable link arrangements and pivotal cam arrangements. An example of a pivotal link arrangement can be found in U.S. Pat. No. 5,152,568 to Blatt which discloses pivotal links 36 and 40 that cooperate with gripper jaws 12A and 12B as shown in FIG. 3.

U.S. Pat. No. 4,518,187 to Blatt et al. discloses a pivotal cam arrangement in which jaw plates 45 and 47 are pivoted by the cooperation of cam slots 61 provided in the jaw plates and a pivot pin 37 (and rollers 39) attached to the piston rod.

Fluid pressure actuated grippers are generally designed for use with particular workpieces to be transferred and with specific work stations. For example, some workpieces and/or work stations may require wider or narrower gripper jaws, different types of gripper jaws, gripper jaws that open at different angles, different clearance requirements, etc. Some work stations may provide restricted access clearance and thus impose limits on the degree to which gripper jaws open. Because of the wide variety of design or performance options required of grippers, manufacturing facilities which utilize fluid actuated grippers typically have numerous sets of grippers which are designed to transport different workpieces between specific work stations. The requirement of stocking multiple sets of grippers adds to the manufacturer's costs.

The present invention is directed to adjustable stoppers and mounting assemblies for fluid pressure actuated grippers which allow more versatility for using the grippers with different workpieces and work stations.

DISCLOSURE OF THE INVENTION

According to other features, characteristics, embodiments and alternatives which will become apparent as the description of the present invention proceeds, the present invention provides a workpiece holder which includes:

a body;

a pair of opposed pivotal jaw members coupled to the body;

an actuator which effects opening and closing of the pair of jaw members; and a stopper which is removably coupled to one of the pair of jaw members and positioned to contact the other of the pair of jaw members so as to limit the angle at which the pair of jaw members are opened by the actuator.

The present invention further provides a mounting assembly for a workpiece holder which includes:

a mounting plate having a partial spherical shaped bore therein;

a clamping plate having a partial spherical shaped bore therein;

a spherical collar having a central through bore positioned between the mounting plate and clamping plate; and threaded fasteners for drawing the clamping plate and mounting plate together.

BRIEF DESCRIPTION OF DRAWINGS

The present invention will be described hereafter with reference to the attached drawings which are given as non-limiting examples only, in which.

BEST MODE OF CARRYING OUT THE INVENTION

Figure 1:
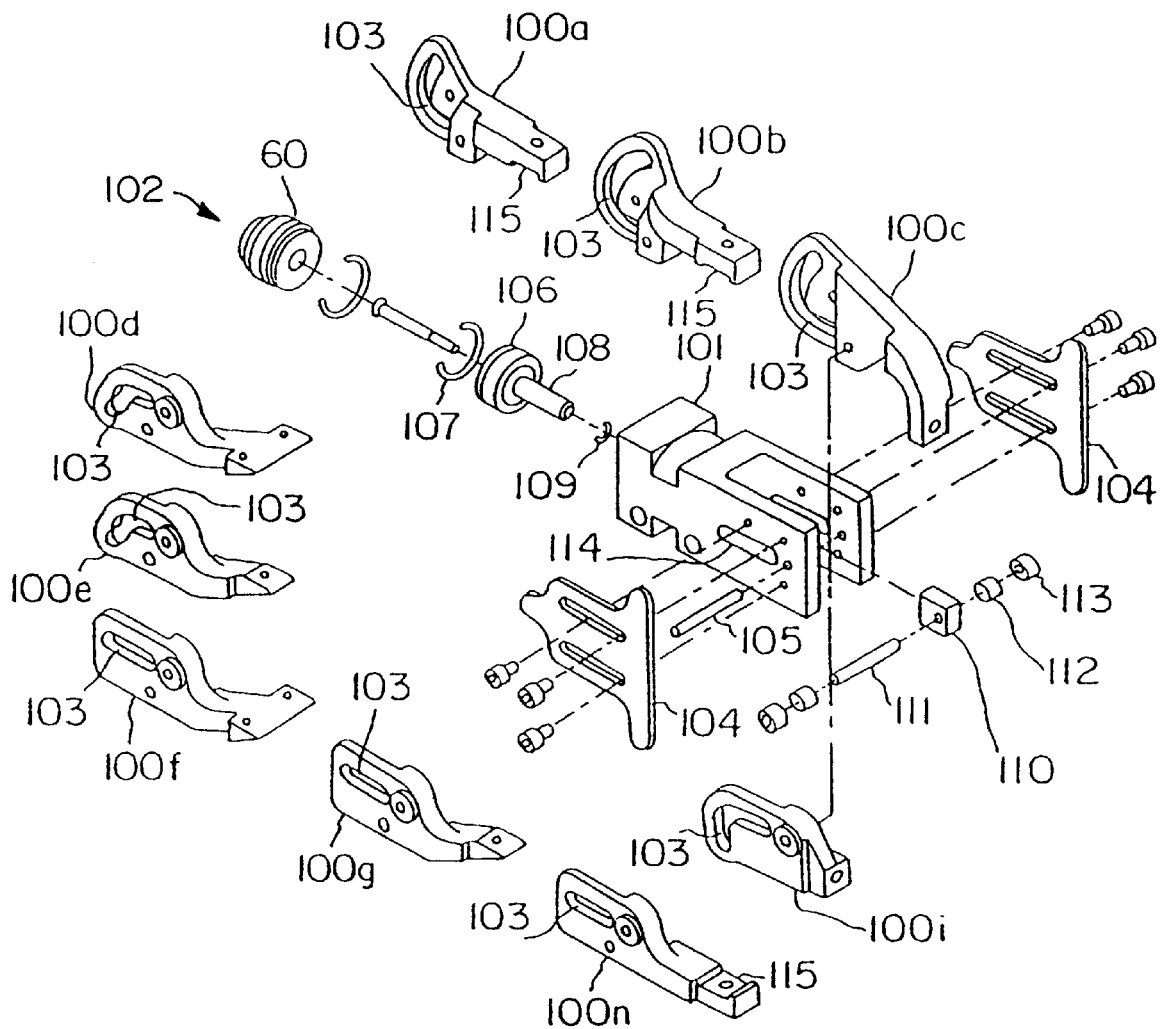
FIG. 1 is an exploded prospective view which depicts components of a modular gripper according to the present invention.

The present invention is directed to fluid pressure actuated grippers of the type employed in automated workpiece handling devices which clampingly grip and transfer a workpiece from one station to another. The gripper devices of the present invention include a pneumatic or hydraulic differential motor which drives a piston rod in a reciprocal fashion, and a pair of jaws which are attached to the piston rod by a mechanical linkage that effects opening and closing of the jaws as the piston rod undergoes reciprocal motion.

The mechanical linkage which connects the gripper jaws to the piston rod and effects opening and closing of the jaws is a pivotal cam type linkage. That is, the gripper jaws include a cam slot which receives a cam pin that is attached to the piston rod. As the piston rod is moved in a reciprocal manner by the pneumatic or hydraulic differential motor, the cam pin slides through the cam slots causing the gripper jaws to open and close. The cam slots are designed to have a particular shape which effects opening and closing of the gripper jaws, and which can further cause the gripper jaws to become locked in either or both a closed position or an open position. "Locked" in position means that the position of the jaws in a closed and/or open position cannot be easily changed except by normal fluid operation of the pneumatic or hydraulic differential motor.

The present invention is further directed to fluid pressure actuated grippers which are assembled from a plurality of modular or interchangeable components. For example, the modular grippers of the present invention include a common body having a yoke structure, a common piston assembly which moves in a reciprocal manner in the yoke structure, a cam pin coupled to the piston assembly, and a plurality of interchangeable components which can be assembled to the yoke structure and piston assembly to provide modular fluid pressure activated grippers having diverse performance characteristics. The interchangeable components of the modular grippers include gripper jaws, gripper tips, reversible gripper tips, pneumatic or hydraulic cylinder end closures or plugs, reversible pneumatic or hydraulic cylinder end closures or plugs, and side or impact plates.

The present invention is further directed to adjustable stoppers and mounting assemblies which can effect the versatility of the fluid pressure actuated grippers or other workpiece holders. The stoppers are designed to be removably attached to a pivotal jaw member so that they abut the opposed jaw member and limit the degree at which the jaw members are opened. The stoppers include a stop block which has an alignment structure that engages with a complementary alignment structure in a jaw member. The stoppers also include one or more stopper pads which extend from the stop blocks. The stopper pads abut the opposing jaw member and are preferably made from a material such as urethane which can absorb shock. According to one embodiment of the present invention, reversible stoppers including two or more stopper pads that have different lengths can be used to adjust the angle at which the jaw members open. Otherwise, the stoppers can be removed and replaced to adjust the angle at which the jaw members open.

The mounting assembly of the present invention includes a spherical collar which is tightened between a mounting plate and a clamping plate. The mounting plate can be attached to the body of a parts gripper or other workpiece holder at the end or a side thereof. The spherical collar includes a central bore which receives a cylindrical support member. Tightening the clamping plate toward the mounting plate causes the spherical collar to be clamped onto the cylindrical support member. The clamping plate includes a circular bore through which the cylindrical support member is passed as it is inserted into the spherical collar. This circular bore is large enough and can further be beveled to allow adjustable angular orientation of the cylindrical support member with respect to the gripper body. The mounting plate can include a circular bore which is approximately the same size as the cylindrical support member. This circular bore allows the cylindrical support member to be easily axially aligned with the gripper body, by merely inserting the cylindrical support member through the spherical collar and into or through the circular bore in the mounting plate.

FIG. 1 is an exploded view which depicts the components of a modular gripper according to the present invention. The "common elements" of this gripper include the body 101, the piston assembly 102, jaw pivot pin 105 and the jaw driver assembly. The piston assembly 102 includes piston 106, piston seal 107, piston shaft 108, and piston shaft seal 109. The jaw driver assembly includes cross piece 110 which is attached to piston shaft 108, cam pin 111 which is coupled to cross piece 110, and jaw bushings 112 which are received in cam slots 103 of the jaw members 100 and slider bushings 113 which are received in longitudinal slots 114 formed in the side walls of the yoke structure of the body 101.

The term "common elements" referred to above is used to identify the basic elements of a modular gripper to which numerous interchangeable parts or elements can be attached or assembled. The "common elements" include the gripper body and the mechanical elements which are used to drive the gripper jaws.

FIG. 1 depicts a number of different interchangeable gripper jaws 100a to 100i which can be assembled in the body 101 and coupled to the jaw driver assembly 102. As depicted, each of the different jaws 100a to 100i have different tip end designs and/or cam slots 100b that effect different movement characteristics. As depicted in FIG. 1 and discussed in more detail below, the modular gripper of the present invention can be assembled to include gripper jaws having different tip designs that can be used for handling, e.g., transporting or transferring, different types of workpieces. Also as discussed below, the modular gripper can be assembled with gripper jaws 100 having different cam slot 103 configurations which can effect the angle at which one or both jaws open or close, and which determine whether or not the jaws lock in an open and/or closed position.

Jaw 100a includes a recessed tip seat 115 and is designed to open either 22.5° or 45° from a closed position. Jaw 100b includes a recessed tip seat 115 and is designed to open 75° from a closed position. Jaw 100c includes a tip seat which can be recessed and is designed to open 55° from a closed position. Jaw 100d includes a double chisel point and is designed to open 22.5° from a closed position. The chisel point includes a bore for receiving a cone point or cone gripper tip discussed below. Jaw 100e is similar to jaw 100d, except jaw 100e includes a single chisel point. Jaw 100f includes a double chisel point and is designed to remain stationary. Jaw 100g is similar to jaw 100e, except jaw 100g includes a single chisel point. Jaw 100h includes a recessed tip seat 115 and is designed to remain stationary. Jaw 100i is a flange jaw and includes a tip seat at the end thereof. Jaw 100i is designed to open 22.5° from a closed position. Jaws 100a –100i are examples of different gripper jaw designs which can be used in various combinations. As will be understood from the following description, the shape and configuration of the slots in the jaws can be varied to effect a desired movement of the jaws, including angular degree of opening and closing, rate of opening and closing and force applied to a workpiece in the closed position. The dimensions depicted throughout the figures are relative and can be scaled up or down as desired.

The side or impact plates 104 depicted in FIG. 1 are both adjustable and interchangeable with other impact plate designs which are discussed below. In addition, the end closure or plug 60 for the pneumatic or hydraulic cylinder is interchangeable with plugs 60 of different lengths which can be used to limit the travel of the piston assembly and hence the angular movement of the gripper jaws 100.

Figure 2:
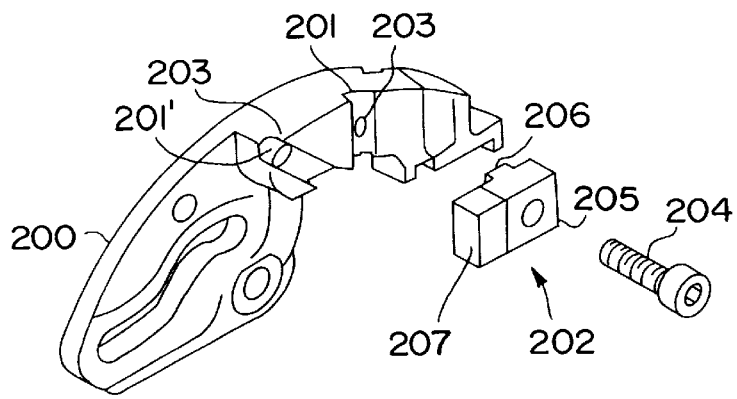
FIG. 2 is a perspective view of an adjustable stopper assembly according to one embodiment of the present invention.

FIG. 2 is a perspective view of an adjustable stopper assembly according to one embodiment of the present invention. The jaw member 200 in FIG. 2 includes an alignment slots 201, 201' on its inner side surface which are configured to receive and properly align stopper 202. The alignment slots 201, 201' include a threaded bore 203 in the bottom thereof which can receive a mechanical fastener, e.g. threaded bolt 204, that is used to secure stopper 202 to the jaw member 200. The alignment slots 201, 201' are spaced along the jaw member 200 and properly aligned so that the stopper 202 can be coupled and fixed relative to the jaw member 200 in different positions which effect different stop angles or maximum open angles of the jaw members of a parts gripper.

The stopper 202 includes a stop block 205 or main body portion which is made from a sturdy material such as steel or other suitable metal. The stop block 205 includes an alignment projection 206 which is configured, e.g. dimensioned, to be received in alignment slot 201 or 201'. The stopper 202 includes a stopper pad 207 which extends from one side of the stop block 205 as depicted. The stopper pad 207 can be made out of any suitable plastic, resinous, or polymeric material such as urethane which can absorb shock when the stopper pad 207 contacts an opposing jaw member. As will be understood from the following description, stopper pads 207 having different lengths can be used to adjust the stop angle or maximum open angle of the jaw members of a parts gripper.

Figure 3:
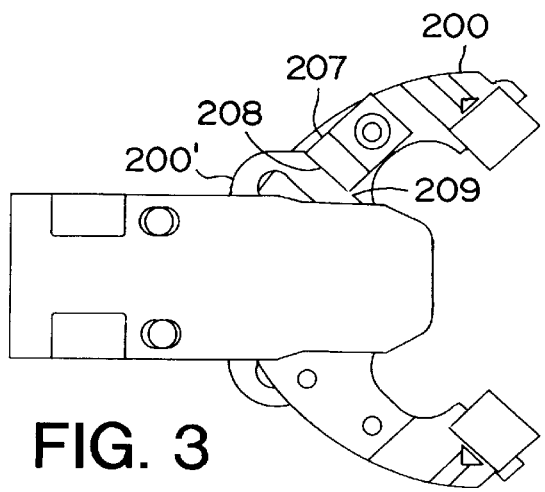
FIG. 3 is a side view of a parts gripper having the adjustable stopper of FIG. 2 installed on one of the jaw members.

FIG. 3 is a side view of a parts gripper having the adjustable stopper of FIG. 2 installed on one of the jaw members. The stopper 202 depicted in FIG. 2 is secured to one of the jaw members 200 of a gripper assembly by inserting the alignment projection 206 of the stop block 205 into the alignment with slot 201 and inserting a mechanical fastener 204 through the stopper 202 and into the jaw member 200. As depicted in FIG. 3, the leading edge 208 of the stopper pad 207 is shaped to abut an inner edge 209 of an opposing jaw member 200', and thereby limit the stop angle or maximum open angle of the jaw members 200, 200'. It is to be understood that it is possible according to the present invention to include two stoppers 202, one on each of the opposed jaw members 200, 200'.

Figure 4:
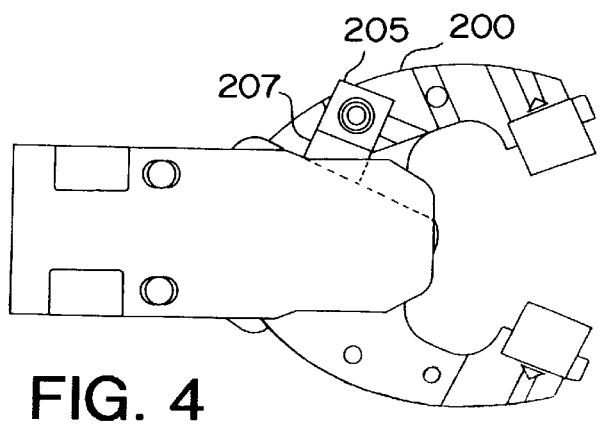
FIG. 4 is a side view of the parts gripper of FIG. 3 having the adjustable stopper installed in a different location on one of the jaw members.

FIG. 4 is a side view of a parts gripper of FIG. 3 having the adjustable stopper installed in a different location on one of the jaw members. The adjustable stopper of FIG. 4 is received in aligmnent slot 201', which is further from the free end of the jaw member 200 than alignment slot 201 and angled differently than alignment slot 201. As can be seen by comparing FIGS. 3 and 4, coupling the stopper 202 in aligmnent slot 201' in FIG. 4 limits the stop angle or maximum open angle of the jaw members 200, 200' more than when the stopper is coupled in alignment slot 201. It is also noted that the leading edge 208 of the stopper pad 207 in FIG. 4 is properly aligned with the inner edge 209 of the opposed jaw member 200' due to the alignment angle of alignment slot 201'. Although two alignment slots 201, 201' are illustrated, it is to be understood that more that two alignment slots could be used.

The stoppers of the present invention can be attached and removed from the jaw members when the jaw members are in their closed positions.

Figure 5:
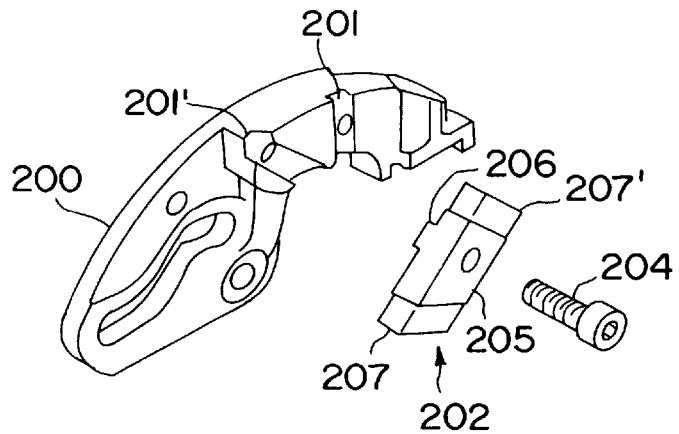
FIG. 5 is a perspective view of an adjustable stopper assembly according to another embodiment of the present invention which includes a reversible stopper.

FIG. 5 is a perspective view of an adjustable stopper assembly according to another embodiment of the present invention which includes a reversible stopper. The stopper 202 of FIG. 5 includes a stop block 205 or main body portion, and stopper pads 207, 207' which extend from opposite sides thereof. As depicted, the stopper pads 207, 207' have different lengths. The stop block 205 also includes an alignment projection 206 which is configured, e.g. dimensioned, to be received in alignment slot 201. As discussed below, the stopper 202 of FIG. 5 can be reversibly secured to a jaw member 200 so that a selected one of the stopper pads 207, 207' presents a leading edge which abuts an opposed jaw member.

Figure 6A:
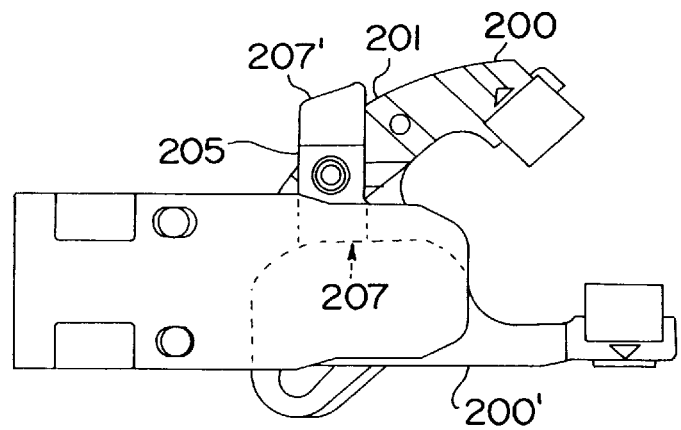
FIGS. 6a and 6b are side views of a parts griper having the reversible stopper of FIG. 5 installed on one of the jaw members.
Figure 6B:
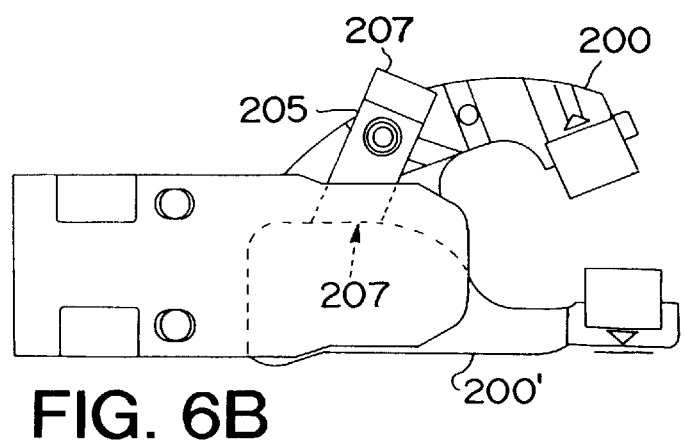

FIGS. 6a and 6b are side views of a parts griper having the reversible stopper of FIG. 5 installed on one of the jaw members. It is noted that FIGS. 6a and 6b depict a parts gripper in which only one of the jaw members is movable. In this regard, it is to be understood that the stoppers of the present invention can be used in conjunction with parts grippers which have one or more movable jaw members.

In FIG. 6a the stopper 202 is secured to jaw member 200 so that the shorter stopper pad 207 abuts the opposing jaw member 200' In FIG. 6b the stopper 202 is secured to jaw member 200 so that the longer stopper pad 207' abuts the opposing jaw member 200'. As can be seen, abutment of the shorter stopper pad 207 in FIG. 6a allows the jaw members 200, 200' to open at a wider angle than abutment of the longer stopper pad 207' in FIG. 6b.

The use of a linear alignment slot and a linear alignment projection allow the stoppers 202 to be reversibly secured to a jaw member. It is also possible according to the present invention to utilize other structural alignment shapes such as circular, star, triangular, cross, etc. and include two or more stopper pads having different lengths.

The parts gripper assemblies can be mounted to a support structure using a mounting plate which clamps around a portion of the assemblies or bolts to a portion thereof.

Figure 7:
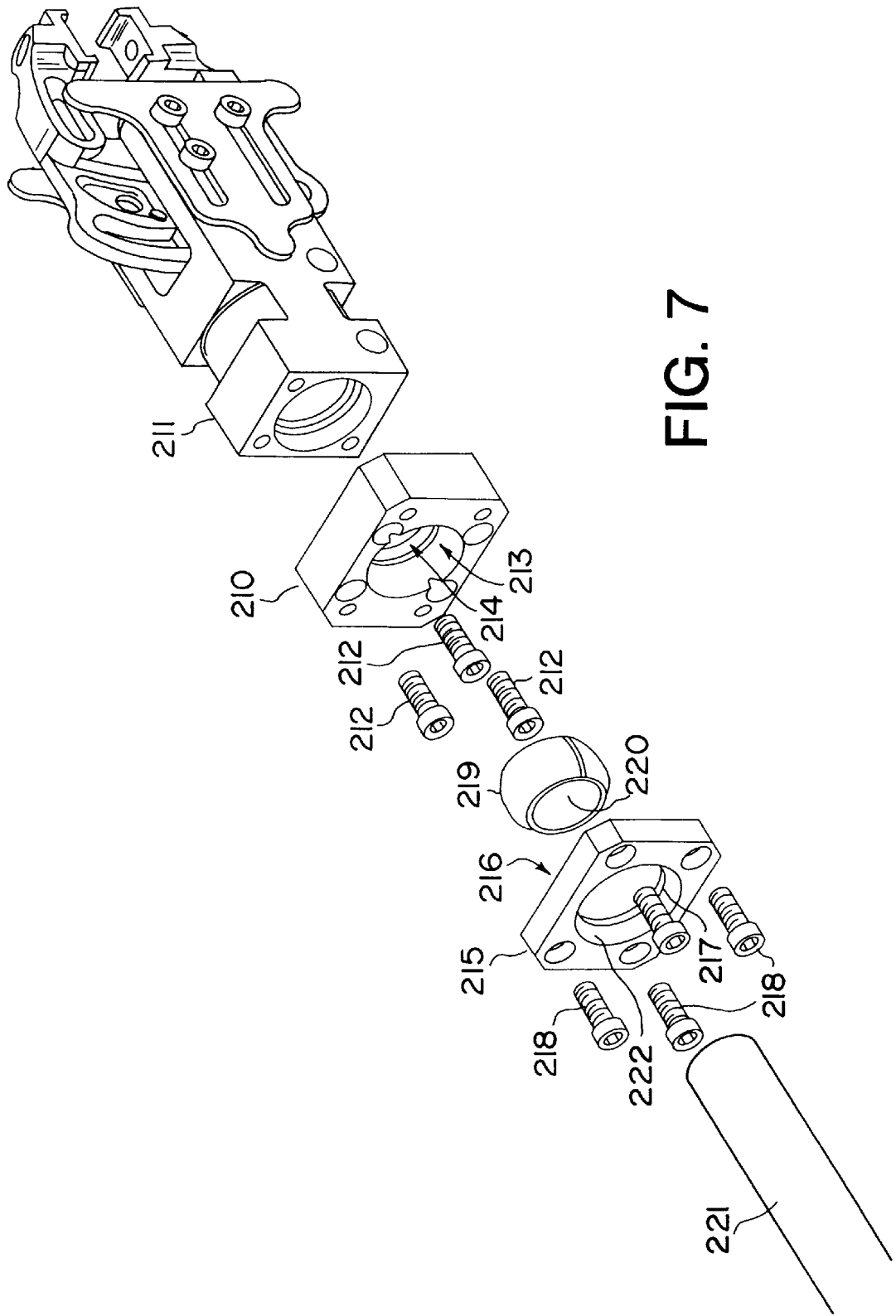
FIG. 7 is an exploded perspective view of a mounting assemble according to one embodiment of the present invention.

FIG. 7 is an exploded perspective view of a mounting assembly according to one embodiment of the present invention which can be mounted to the rear or a side of a parts gripper. The mounting assembly includes a mounting plate 210 which can be secured to the rear (or other portion) of a parts gripper 211 by suitable mechanical fasteners 212 or other means. Mounting plate 210 includes a partial spherical recess 213 and a circular bore 214 which is aligned with the central axis of the mounting plate 210. The mounting assembly includes a clamping plate 215 which has a partial spherical recess 216 and a circular bore 217. The clamping plate 215 can be coupled to the mounting plate 210 by suitable mechanical fasteners 218, e.g. threaded bolts. A split spherical collar 219 is positioned between the clamping plate 215 and mounting plate 210. The spherical collar 219 includes a central bore 220 which is sized to receive a cylindrical support member 221. The central bore 220 of the spherical collar 219 has an inside diameter which is slightly larger than the outside diameter of the cylindrical support member 221, so that the cylindrical support member 221 can be easily passed therein as discussed below.

The spherical collar 219 has an outside diameter which is slightly larger that the inner diameter of the partial spherical recesses of the mounting plate 210 and the clamping plate 215, so that as the clamping plate 215 is tightened against or toward the mounting plate 210, the spherical collar 219 is clamped in position and tightened about cylindrical support member 221.

The circular bore 217 of the clamping plate 215 is larger in diameter than the cylindrical support member 221 so that the cylindrical support member 221 can be angularly aligned with respect to the central axis of the parts gripper 211. The degree of this angular alignment can be increased by providing a beveled edge 222 at the outer edge of the circular bore 217 as shown.

The circular bore 214 of the mounting plate 210 is preferably sized to have an inner diameter which is approximately equal to or slightly larger than the outer diameter of the cylindrical support member 221 so that when the cylindrical support member 221 is inserted through the spherical collar 219 and into the circular bore 214 of the mounting plate 210, the cylindrical support member 221 is in fixed axial alignment with the mounting plate 210 and parts gripper 211. In contrast, when the cylindrical support member 221 is only inserted into the central bore 220 of the spherical collar 219, the angular alignment between the parts gripper 211 and cylindrical support member 221 can be adjusted, and fixed once the clamping plate 215 is tightened toward the mounting plate 210.

In order to provide a tighter grip between the spherical collar 219 and each of the mounting plates 210 and the clamping plate 215, the spherical collar 219 can have a roughened, e.g., ribbed, grooved, etc., outer surface. Making the spherical collar 219 out of a hard metal and making the mounting plate 210 and clamping plate 215 out of a softer steel or an alloy of aluminum, brass, etc. will also allow better gripping between these elements. It is also possible to provide the partial spherical recesses 213 and 216 with a roughened inner surface.

The mounting assembly of the present invention is not limited for use in parts grippers. That is, the mounting assembly could be used with a variety of workpiece holders and other structural supports. It is also possible to have the mounting plate formed as an integral part of a workpiece holder.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the following claims.

What is claimed:

1. A workpiece holder comprising:
    a body;
    two opposed jaw members coupled to the body, at least one of the two opposed jaw members being pivotal with respect to the body;
    an actuator located with the body which effects opening and closing of the two opposed jaw members; and
    a stopper which is removably coupled and fixed relative to a pivotal one of the two opposed jaw members and positioned to contact the other of the two opposed jaw members so as to limit the angle at which the two opposed jaw members are opened by the actuator.

2. A workpiece holder according to claim 1, wherein the stopper includes an alignment projection which is received in a complementarity shaped alignment recess in the one of the two opposed jaw members.

3. A workpiece holder according to claim 2, wherein the alignment recess comprises a slot.

4. A workpiece holder according to claim 1, wherein the stopper includes a stop block and a stopper pad which contacts the other of the two opposed jaw members and thereby limits the angle at which the two opposed jaw members are opened.

5. A workpiece holder according to claim 4, wherein the stopper pad has a leading edge surface which is configured to abut an edge surface of the other of the two opposed jaw members.

6. A workpiece holder according to claim 4, wherein the stopper pad is made from a shock absorbing material.

7. A workpiece holder according to claim 1, wherein the stopper includes a stop block and a plurality of stopper pads, each of the stopper pads having a different length.

8. A workpiece holder according to claim 7, wherein each of the plurality of stopper pads has a leading edge with a different angular shape.

9. A workpiece holder according to claim 1, wherein the stopper is accessibly removable when the two opposed jaw members are at least partially closed.

10. A workpiece holder according to claim 1, wherein each of the two opposed jaw members has a stopper removable coupled thereto.

11. A workpiece holder according to claim 1, wherein one of the two opposed jaw members is stationary and the stopper is coupled to the other of the two opposed jaw members.

12. A workpiece holder comprising:
    a body;
    two opposed jaw members coupled to the body, at least one of the two opposed jaw members being pivotal with respect to the body;
    an actuator located in the body which effects opening and closing of the two opposed jaw members; and
    a stopper which is removable coupled and fixed relative to one of the two opposed jaw members and positioned to contact the other of the two opposed jaw members so as to limit the angle at which the two opposed jaw members are opened by the actuator, the stopper having at least two pair of opposed parallel surfaces.

13. A workpiece holder comprising:
    a body;
    two opposed jaw members coupled to the body, at least one of the two opposed jaw members being pivotal with respect to the body;
    an actuator located with the body which effects opening and closing of the two opposed jaw members; and
    a stopper which is removable coupled and fixed relative to a pivotal one of the two opposed jaw members and positioned to contact the other of the two opposed jaw members so as to limit the angle at which the two opposed jaw members are opened by the actuator, the stopper comprising a shock absorbing material selected from the group consisting of plastic, resinous, and polymeric materials.

14. A workpiece holder according to claim 12, wherein the stopper includes an alignment projection which is received in a complementarily shaped alignment recess in the one of the two opposed jaw members.

15. A workpiece holder according to claim 14, wherein the alignment recess comprises a slot.

16. A workpiece holder according to claim 12, wherein the stopper includes a stop block and a stopper pad which contacts the other of the two opposed jaw members and thereby limits the angle at which the pair of jaw members are opened.

17. A workpiece holder according to claim 12, wherein the stopper includes a stop block and a plurality of stopper pads, each of the stopper pads having a different length.

18. A workpiece holder according to claim 13, wherein the stopper includes an alignment projection which is received in a complementarily shaped alignment recess in the one of the two opposed jaw members.

19. A workpiece holder according to claim 18, wherein the alignment recess comprises a slot.

20. A workpiece holder according to claim 13, wherein the stopper includes a stop block and a stopper pad which contacts the other of the two opposed jaw members and thereby limits the angle at which the pair of jaw members are opened.

21. A workpiece holder according to claim 13, wherein the stopper includes a stop block and a plurality of stopper pads, each of the stopper pads having a different length.

* * * * *